April 18, 1950   M. A. PRINGLE   2,504,876
METAL-ENCLOSED SWITCHGEAR
Filed June 30, 1947   2 Sheets-Sheet 2

WITNESSES:
E. A. McCloskey.
H. G. Chilcott

INVENTOR
Mark A. Pringle.
BY
L. M. Crawford
ATTORNEY

April 18, 1950     M. A. PRINGLE     2,504,876
METAL-ENCLOSED SWITCHGEAR
Filed June 30, 1947     2 Sheets-Sheet 1
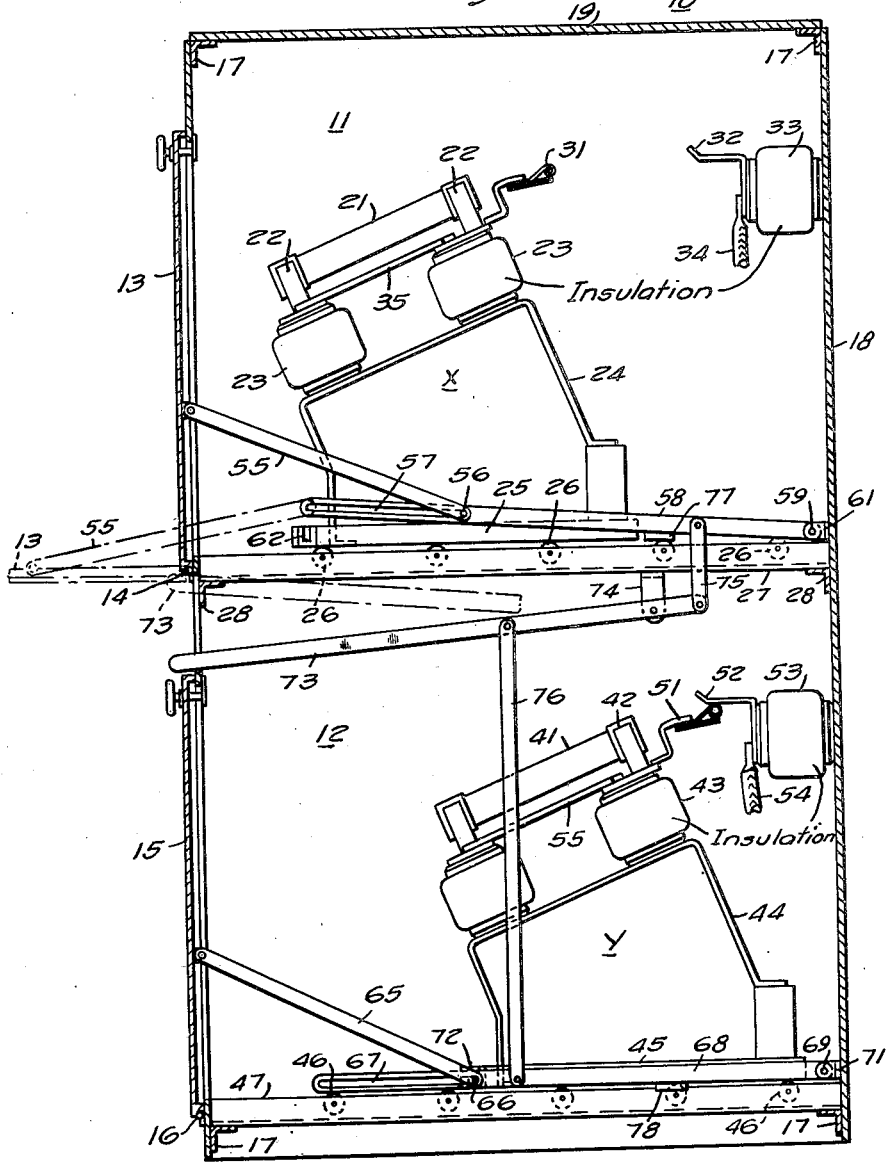
WITNESSES:
INVENTOR
Mark A. Pringle.
ATTORNEY Patented Apr. 18, 1950

2,504,876

UNITED STATES PATENT OFFICE 2,504,876

METAL-ENCLOSED SWITCHGEAR

Mark A. Pringle, Teaneck, N. J., assignor to Westinghouse Electric Corporation, East Pittsburgh, Pa., a corporation of Pennsylvania Application June 30, 1947, Serial No. 758,201

8 Claims. (Cl. 200—50)

My invention relates, generally, to switchgear apparatus and, more particularly, to switchgear apparatus of the metal-enclosed type wherein all energized parts are normally enclosed within metal housings or casings.

There are frequently applications of switchgear apparatus to systems having two main sources of power and only one or two feeder circuits each having an electrically closed circuit breaker. Such an installation does not justify the expense nor the size of structure necessary when apparatus for two complete auxiliary power sources is provided.

An object of my invention, generally stated, is to provide a metal-enclosed switchgear structure which shall be simple and efficient in operation and which may be economically manufactured and installed.

A more specific object of my invention is to provide for selectively connecting a power translating device to one or the other of two power circuits.

Another object of my invention is to provide metal-enclosed switchgear units of the horizontal drawout type suitable for making electrical connections to one or the other but not both of two power circuits.

A further object of my invention is to provide for mechanically interlocking a pair of selectively operated horizontal drawout metal-enclosed switchgear units.

Other objects of my invention will be explained fully hereinafter or will be apparent to those skilled in the art.

In accordance with one embodiment of my invention, a selector mechanism is provided for connecting one or the other of two sets of door-operated links to the selected one of a pair of drawout fuse units. The selected unit may then be actuated to the engaged position in its cell by closing its cell door. The other unit remains in the disengaged position when its cell door is closed. Thus, the fuse units may be utilized to connect a power translating device to one or the other of two power sources.

For a better understanding of the nature and objects of my invention, reference may be had to the following detailed description, taken in conjunction with the accompanying drawings, in which:

Figure 1 is a view, partially in side elevation and partially in section, of a switchgear structure embodying the principal features of my invention;

Figure 2:
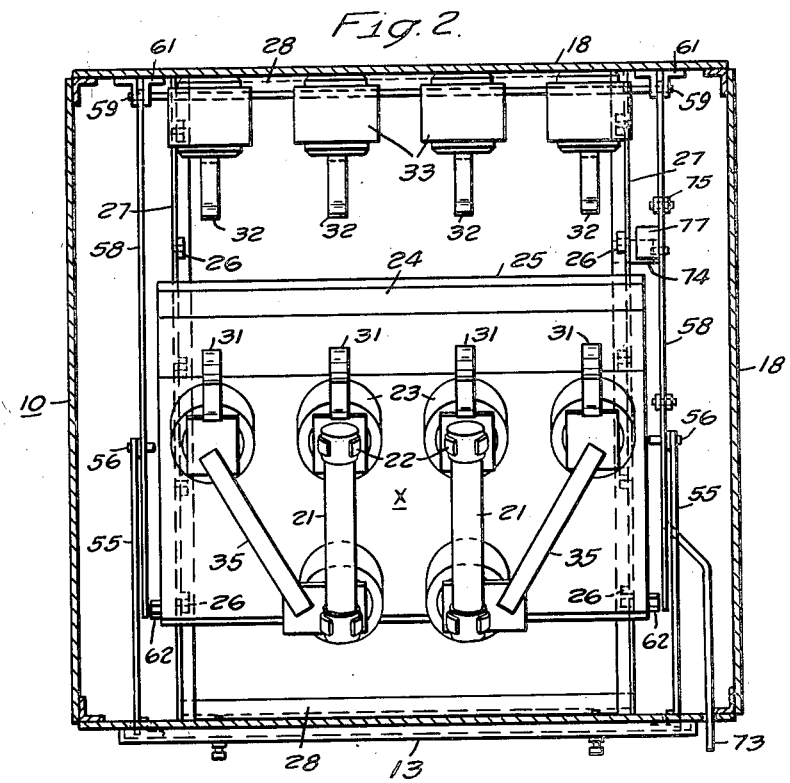
Fig. 2 is a view, partially in plan and partially in section of a portion of the structure shown in Fig. 1.

Referring to the drawings, and particularly to Figs. 1 and 2, the switchgear structure shown therein comprises a sheet metal cell for housing 10 which may be divided into two compartments 11 and 12. The upper compartment 11 is provided with a door 13 which is hinged at 14 and the lower compartment 12 is provided with a door 15 which is hinged at 16. The housing 10 may be of the usual construction comprising angle frame members 17, side plates 18 and a top plate 19.

As explained hereinbefore, it is frequently desirable to provide for energizing a transformer or other power translating device from either one of two sources of power. In order to do this, it is necessary to provide some kind of switching apparatus for selectively connecting the transformer to one or the other of the two sources of power and also for preventing the transformer from being connected to both sources at the same time.

Figure 3:
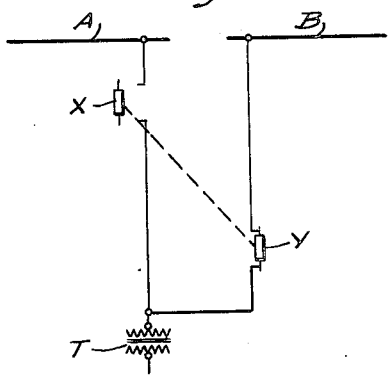
Fig. 3 is a diagrammatic view of a power system utilizing the invention.

Thus, as illustrated schematically in Fig. 3, a transformer T may be connected either to a power source A or to a power source B through switching devices X and Y, respectively. As indicated by the dotted line, the devices X and Y are so interlocked that only one of them can be closed at a time.

In accordance with my invention, the switching devices X and Y are current limiting fuses which function to protect the transformer T against excessive amounts of current and are so mounted in the housing 10 that only one set of fuses can be connected at a time. As shown in Fig. 3, the transformer T is connected to the power source B through the fuses Y which are in the energized position.

If it is desired to connect the transformer to the power source A, the fuses Y must first be moved to the deenergized position and the fuses X then moved to the energized position. Thus, as previously explained, the fuses provide a means of selectively connecting the transformer to one or the other of two sources of power and also protect the transformer against overload conditions.

As shown in Figs. 1 and 2, the fuse assembly X comprises a plurality of fuses 21 which are mounted in fuse clips 22 of the usual type. The clips 22 are supported by insulating members 23 which are mounted upon a bracket 24. The bracket 24 is secured to a movable truck 25 which rests upon rollers 26 rotatably mounted on angle bars 27 which, in turn, rest upon angle bars 28 secured to the sides of the housing 10.

One terminal of each fuse 21 is electrically connected to a contact member 31 which is disposed to engage a contact member 32 when the truck 25 is moved inwardly in the compartment 11. The contact member 32 is supported by an insulating member 33 secured to the back wall 18 of the housing 10. As shown, a power conductor 34 may be connected to the contact member 32.

As shown in Fig. 2, the other terminal of each fuse 21 is electrically connected to another contact member 31 through a conductor 35. Thus, when the truck 25 is moved inwardly in the compartment 11 to cause all of the contact members 31 to engage their cooperating contact members 32, electrical circuits are established through the fuses 21. The contact members 32 may be connected to the proper power conductors by connections made externally of the housing 10.

The fuse assembly Y is similar to the fuse assembly X and comprises fuses 41 which are mounted in fuse clips 42. The clips 42 are supported by insulators 43 which are mounted upon a bracket 44. The bracket 44 is secured to a truck 45 which rests upon rollers 46 rotatably mounted on angle bars 47. As shown, the angle bars 47 are supported by the angle bars 17 which are secured to the sides of the housing 10.

The terminals of the fuses 41 are connected to contact members 51 which are disposed to engage contact members 52 when the truck 45 is moved inwardly into the compartment 12. The contact members 52 are mounted upon insulators 53 secured to the wall 18 of the housing 10. Power conductors 54 may be connected to the contact members 52.

The truck 25 may be moved in the compartment 11 by means of a pair of links 55. One end of each link 55 is pivotally connected to the door 13 and the other end is provided with a pin 56 which is disposed in a slot 57 provided in an arm 58, one end of which is secured to a horizontal shaft 59 rotatably mounted in brackets 61 secured to the rear wall 18 of the housing 10.

In order to move the truck 25 inwardly in the compartment 11, it is necessary to cause the pin 56 to be disposed between the legs of a U-shaped bracket 62 which is secured to the front end of the truck 25. This may be done in a manner which will be more fully described hereinafter.

The truck 45, which is shown fully inserted into the compartment 12, may be moved outwardly by means of a pair of links 65. One end of each link 65 is pivotally connected to the door 15 and the other end is provided with a pin 66 which is disposed in a slot 67 provided in an arm 68, one end of which is secured to a shaft 69 which is rotatably mounted in brackets 71. As shown, the pin 66 is disposed between the legs of a U-shaped bracket 72 which is secured to the front end of the truck 45.

If it is desired to disengage the fuses 41 from the contact members 52 and connect the fuses 21 to the contact members 32 in order to change the transformer connections from the power source B to the power source A, as illustrated in Fig. 3, it is necessary to open both of the doors 13 and 15. Since the truck 25 is already in its outermost position in the compartment and the fuses 21 are deenergized, the truck 25 is not moved by the opening of the door 13. However, the opening of the door 15 causes the truck 45 to be withdrawn to a position corresponding to that of the truck 25, as shown in Fig. 1.

A selector lever 73, one end of which extends exteriorly of the housing 10, is then raised upwardly to the position shown by the broken lines in Fig. 1. The lever 73 is supported by a bracket 74 which may be secured to one of the angle bars 27. The bracket 74 is the fulcrum for the lever 73.

As shown, the lever 73 is connected to one of the arms 58 by a link 75. The lever 73 is connected to one of the arms 68 by a link 76. The links 75 and 76 are so connected to the arms 58 and 68, respectively, that the arm 58 is lowered and the arm 68 is raised when the lever 73 is actuated to the position shown by the broken lines in Fig. 1. Thus, the pins 66 are disengaged from the brackets 72 and the pins 56, which have been moved to a position directly above the brackets 62 by opening the door 13, as indicated by the broken lines in Fig. 1, are lowered into the brackets 62.

Since both of the arms 58 which control the operation of the links 55 are secured to the shaft 59, it will be seen that both links 55 are moved simultaneously by the operation of the lever 73. Likewise, since both of the arms 68 are secured to the horizontal shaft 69, both of the links 65 are moved simultaneously by the operation of the single lever 73.

The truck 25 may then be moved inwardly by closing the door 13. Since the links 65 have been disengaged from the truck 45, the truck remains in its outermost position in the compartment when the door 15 is closed.

As shown in Fig. 1, an interlocking member 77 is secured to the arm 58. The member 77 is so disposed that it blocks inward movement of the truck 25 when the arm 58 is in its raised position. Thus, the truck 25 cannot be inadvertently moved inwardly to cause the contact members 31 to engage the contact members 32.

Furthermore, by referring to Fig. 2, it will be seen that the member 77 will extend underneath the truck 25 when the arm 58 is lowered and the truck is fully inserted into the housing 10. A similar interlocking member 78 is secured to the arm 68. The member 78 extends underneath the truck 45, as shown in Fig. 1. Thus, it is necessary for both trucks to be in their outermost positions in the housing before the lever 73 can be actuated from one position to the other.

Therefore, both doors must be open before the pins 66 can be disengaged from the brackets 72 and the pins 56 engaged in the brackets 62 or vice versa. The interlocking member 78 also functions to prevent the truck 45 from being inadvertently moved inwardly when the pin 66 is disengaged from the bracket 72.

From the foregoing description, it is apparent that I have provided a switchgear structure which permits fuse assemblies to be utilized for both protecting electrical apparatus and selectively connecting the apparatus to different power conductors. By utilizing the present structure, it becomes unnecessary to provide other switching means for selectively connecting the apparatus to the desired power source. While the present structure has been illustrated and described in connection with a power transformer, it is not necessarily limited thereto and may be utilized for other applications.

Since numerous changes may be made in the above-described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In switchgear apparatus, in combination, a pair of compartments, a truck movably disposed in each compartment, a hinged door for each compartment, link means for connecting the door for each compartment to the truck in that compartment to move the truck within the compartment, and a single means extending exteriorly of the compartments and operable only when both of said doors are open for selectively connecting one or the other of said link means to its respective truck.

2. In switchgear apparatus, in combination, a pair of compartments, a truck movably disposed in each compartment, a hinged door for each compartment, link means for connecting the door for each compartment to the truck in that compartment to move the truck within the compartment, and lever means operable only when both of said doors are open for selectively causing one or the other of said link means to engage or disengage its respective truck.

3. In switchgear apparatus, in combination, a pair of compartments, a truck movably disposed in each compartment, a hinged door for each compartment, link means for connecting the door for each compartment to the truck in that compartment to move the truck within the compartment, and lever means extending exteriorly of the compartments and operable only when both of said doors are open for selectively causing one or the other of said link means to engage or disengage its respective truck.

4. In switchgear apparatus, in combination, a pair of compartments, a truck movably disposed in each compartment, a hinged door for each compartment, link means for connecting the door for each compartment to the truck in that compartment to move the truck within the compartment, and a single means extending exteriorly of the compartments and operable only when both of said doors are open for selectively causing one or the other of said link means to engage or disengage its respective truck.

5. In switchgear apparatus, in combination, a pair of compartments, a truck movably disposed in each compartment, a hinged door for each compartment, link means for connecting the door for each compartment to the truck in that compartment to move the truck within the compartment, lever means operable only when both of said doors are open for selectively causing one or the other of said link means to engage or disengage its respective truck, and interlocking means for blocking inward movement of the disengaged truck.

6. In switchgear apparatus, in combination, a pair of compartments, a truck movably disposed in each compartment, a hinged door for each compartment, link means for connecting the door for each compartment to the truck in that compartment to move the truck within the compartment, lever means operable only when both of said doors are open for selectively causing one or the other of said link means to engage or disengage its respective truck, and interlocking means actuated by said lever means for blocking inward movement of the disengaged truck.

7. In switchgear apparatus, in combination, a pair of compartments, a truck movably disposed in each compartment, a hinged door for each compartment, link means for connecting the door for each compartment to the truck in that compartment to move the truck within the compartment, manually operable lever means for selectively causing one or the other of said link means to engage or disengage its respective truck, and interlocking means for blocking inward movement of the disengaged truck and for preventing the operation of said manually operable lever means unless both trucks are moved outwardly beyond a predetermined point in the compartments.

8. In switchgear apparatus, in combination, a pair of compartments, a truck movably disposed in each compartment, a hinged door for each compartment, link means for connecting the door for each compartment to the truck in that compartment to move the truck within the compartment, manually operable lever means for selectively causing one or the other of said link means to engage or disengage its respective truck, and interlocking means carried by said manually operable lever means for blocking inward movement of the disengaged truck and for preventing the operation of said manually operable lever means when either truck is moved inwardly beyond a predetermined point in its compartment.

MARK A. PRINGLE.

REFERENCES CITED

The following references are of record in the file of this patent:

UNITED STATES PATENTS

| Number | Name | Date |
|---|---|---|
| 1,496,751 | Wood | June 3, 1924 |
| 1,596,513 | Ainsworth | Aug. 17, 1926 |
| 1,718,374 | Oberst | June 25, 1929 |
| 1,928,460 | Paxton et al. | Sept. 26, 1933 |
| 2,128,648 | Johansson | Aug. 30, 1938 |

FOREIGN PATENTS

| Number | Country | Date |
|---|---|---|
| 681,946 | Germany | Oct. 11, 1939 |